United States Patent [19]

Severinsson

[11] Patent Number: 4,953,668
[45] Date of Patent: Sep. 4, 1990

[54] ACTUATOR

[75] Inventor: Lars M. Severinsson, Hishult, Sweden

[73] Assignee: SAB Nordic AB, Landskrona, Sweden

[21] Appl. No.: 326,118

[22] Filed: Mar. 20, 1989

[30] Foreign Application Priority Data

Mar. 21, 1988 [SE] Sweden ................. 8801027

[51] Int. Cl.$^5$ .................. B61H 13/00; F16D 65/34
[52] U.S. Cl. ........................... 188/158; 74/89; 188/72.1; 188/162; 188/171
[58] Field of Search ............ 188/161, 163, 171, 158, 188/72.1, 170, 156, 162; 74/89, 89.15, 424.8 R, 110

[56] References Cited

U.S. PATENT DOCUMENTS

| | | |
|---|---|---|
| 874,219 | 12/1907 | Mahoney . |
| 2,218,605 | 10/1940 | Down . |
| 3,131,788 | 5/1964 | Newell . |
| 3,217,843 | 11/1965 | Newell et al. . |
| 3,280,944 | 10/1966 | Kyllonen . |
| 4,033,435 | 7/1977 | Bayliss . |
| 4,202,430 | 5/1980 | Stevens . |
| 4,567,967 | 2/1986 | Crossman .............. 188/161 X |
| 4,615,228 | 10/1986 | Severinsson .............. 74/110 X |
| 4,836,338 | 6/1989 | Taig .................. 188/161 X |

FOREIGN PATENT DOCUMENTS

| | | |
|---|---|---|
| 166156 | 5/1985 | European Pat. Off. . |
| 155417 | 9/1985 | European Pat. Off. . |
| 235035 | 9/1987 | European Pat. Off. . |
| 275783 | 7/1988 | European Pat. Off. . |
| 3010335 | 3/1980 | Fed. Rep. of Germany . |
| WO8804741 | 6/1988 | PCT Int'l Appl. . |
| 2141500 | 12/1984 | United Kingdom . |

Primary Examiner—Douglas C. Butler
Attorney, Agent, or Firm—Laurence R. Brown

[57] ABSTRACT

An actuator for supplying a controlled force or attaining a controlled position, especially an electro-mechanical brake unit, includes a drive sleeve (8), which may be subjected to a torque, for example from a coil spring (6), and a ball screw (15, 25) for transforming the torque into an axial force for brake application. Between the drive sleeve and the ball screw there is a control arrangement, comprising an outer locking spring (16), a control sleeve (17), and an inner locking spring (18), a control motor (20) being connected to the control sleeve for rotation thereof in either direction. The control sleeve is connected to the locking springs for control of their locking and unlocking functions.

9 Claims, 3 Drawing Sheets

ACTUATOR

TECHNICAL FIELD

This invention relates to an actuator, including a housing, a drive sleeve to be subjected to rotational movement and a drive ring for supplying a rotational movement.

The invention is exemplified by its use as a brake unit, preferably for a rail vehicle, but it may equally well be used in numerous applications and embodiments where a controlled force is to be supplied or a controlled position for an external load is to be attained. The actuator may supply a rotational movement or torque, but will preferably—by the inclusion of means transforming the rotational movement into an axial movement, for example a conventional ball screw—supply an axial movement or force.

BACKGROUND OF THE INVENTION

Conventionally, the braking of a rail vehicle is performed in that compressed air is admitted to a brake cylinder, wherein a piston moves axially and transmits an axial brake force. As an alternative, most often used for parking and emergency braking but occasionally also for service braking, a powerful spring is normally held compressed by compressed air in a cylinder, but when the air pressure is lowered a brake force is exerted.

There is currently a trend towards avoiding a compressed air system on modern rail vehicles, which means that no air for control or power generation is available. In contrast it is often desirable to utilize electricity both as the power generating medium and the control medium, partly in view of the frequent use of electronics in control systems and the simplicity in the equipment for transferring power in the form of electricity, which can be used for diverse applications on board a modern rail vehicle.

Accordingly, it is a growing interest for the concept called "braking by wire", i.e. a system in which electric power is transformed into a mechanical brake force in relation to an electric signal supplied from the driver. The requirements on such a system are high, for example with regard to accuracy and response times in view of possible anti-skid functions and so forth, but also with regard to simplicity, reliability and ability to withstand the rather extreme environmental stresses underneath a rail vehicle.

Several attempts to accomplish designs fulfilling the different requirements on so called electro-mechanical actuators or brake units are known. Examples of solutions where an electric motor is used to tension a normal spring (a helical spring), which applies the brake force when desired, are disclosed in US-A-874 219, US-A-2 218 605, US-A-4 033 435, US-A-4 202 430, DE-A-3 010 335, GB-A-2 141 500, and EP-A:166 156.

There are also examples of solutions where the energy from the electric motor is stored in a coil spring or clock spring, namely US-A-3 131 788, US-A-3 217 843, and US-A-3 280 944. In these solutions, stemming from one source, the application of the brake is controlled by the motor, which also is used for tensioning the spring. By this technique it is virtually impossible to obtain the response times and control necessary in modern systems.

THE INVENTION

In order to fulfil all requirements imposed thereon an actuator according to the invention is characterized by clutch means between the drive sleeve and the housing for permitting rotation of the former in a first direction, further by a locking spring for connection between the drive sleeve and the drive ring, which is coaxial therewith, and by means for controlling the locking spring to perform its function to connect the drive sleeve with the drive ring only at the rotation of the drive sleeve in the first direction but to allow rotation of the drive ring in a second direction.

If used as brake unit for a rail vehicle, an actuator according to the invention includes a drive sleeve, which can be subjected to the torque from a coil spring, a motor or any other means for creating a brake force, and a drive ring, connected to a ball screw or similar means for transforming the torque into an axial force for brake application. The invention resides in the controllable means for transferring the torque between the drive sleeve and the drive ring. In a brake unit the first direction is the brake application direction, whereas the second direction accordingly is the brake release direction.

Preferably the means for controlling the locking spring is a control sleeve, which is concentric with the drive sleeve and the drive ring and is connected with one end of the locking spring, whereby rotation of the control sleeve in the second direction will open the locking spring and allow the drive ring to rotate the same angular distance as the control sleeve in the second direction.

In one embodiment of the invention the drive sleeve is subjected to the torque of a coil spring tensioned by a motor, preferably an electric motor. In that case the clutch means between the drive sleeve and the housing of the unit may preferably be a further locking spring normally preventing rotation of the drive sleeve in the first direction, and one end of the locking spring is connected to the control sleeve, whereby rotation thereof in the first direction will open the locking spring and allow the drive sleeve to rotate the same angular distance as the control sleeve in the first direction.

In order to fulfil the requirement to control the actuator or brake unit "by wire" the control sleeve may be connected to an electric control motor for its rotation in either direction, leading to rotation of the drive ring in either direction.

In another embodiment of the invention the drive sleeve is directly connected to a rotary motor, preferably an electric motor. In that case the clutch means between the drive sleeve and the housing is a further locking spring for permitting rotation of the drive sleeve by the motor only in the first direction.

The motor is preferably drivingly connected to the control sleeve for permitting rotation thereof in both directions, whereas in the connection between the motor and the drive sleeve is arranged a one-way clutch only transmitting rotation to the drive sleeve in the first direction.

In still another embodiment of the invention the drive sleeve—as in the first embodiment—is subjected to the torque of a coil spring tensioned by a motor, preferably an electric motor. Again, the clutch means is an outer locking spring normally preventing rotation of the drive sleeve in the first direction. In this embodiment the means for controlling the locking spring arranged between the drive sleeve and the drive ring—an inner locking spring—said means also controlling the outer locking spring, is a control member, which is axially movable under the influence of two electromagnets for unlocking the end of either locking spring from the housing or the drive ring, respectively, and accordingly for allowing rotation of the drive sleeve in the first direction or the drive ring in the second direction, respectively.

BRIEF DESCRIPTION OF THE DRAWINGS

The invention will be described in further detail below reference being made to the accompanying drawings, in which.

DETAILED DESCRIPTION OF PREFERRED EMBODIMENT

Figure 1:
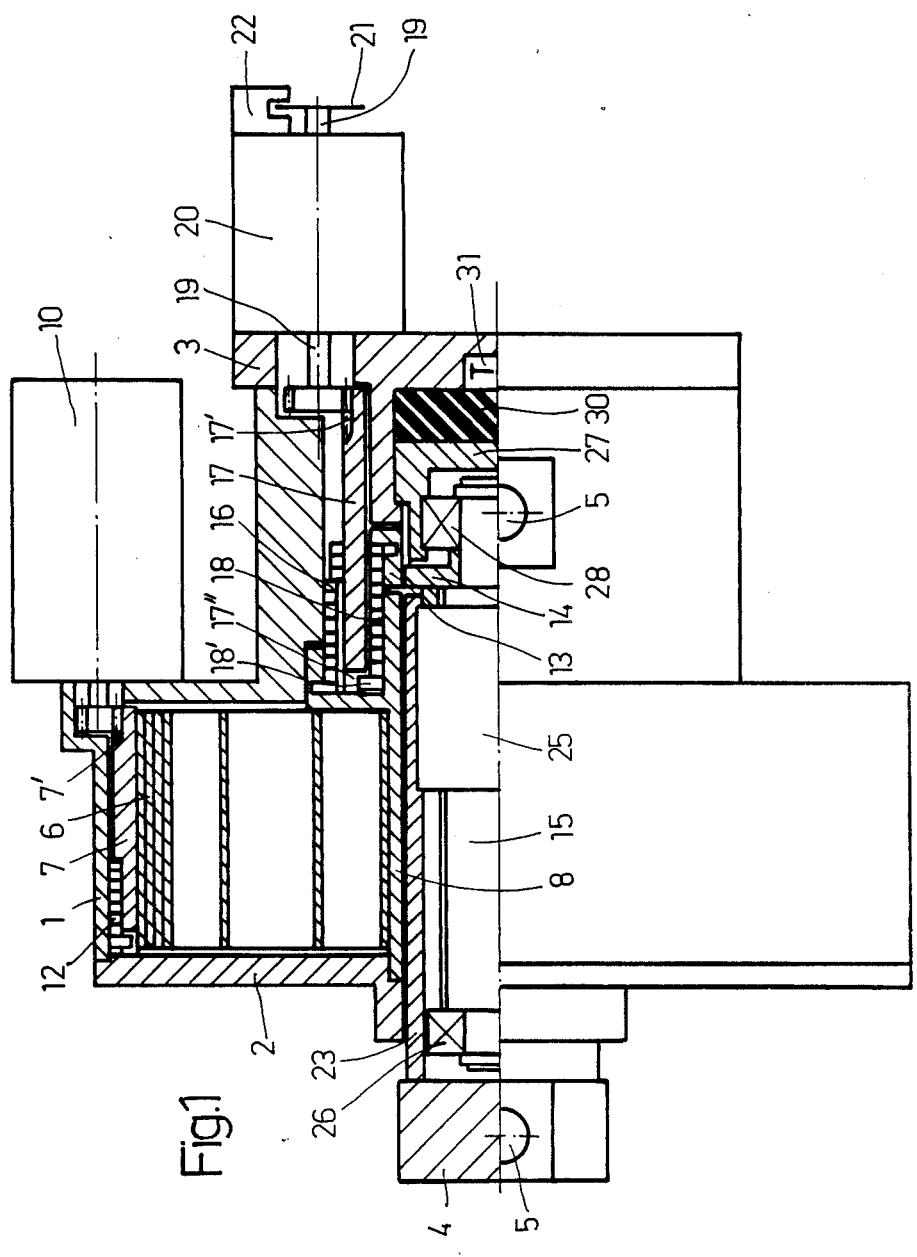
FIGS. 1-3 are respective side views, partly in section, of three embodiments of an actuator, namely an electro-mechanical brake unit, according to the invention.

An electro-mechanical brake unit according to FIG. 1 has a housing 1 with a spring lid 2 to the left in the drawing and a mechanism lid 3 to the right. The lids 2 and 3 are screwed on the housing 1. The unit is also provided with a force transmitting member 4, which as appears below is axially movable in relation to the housing 1. The housing 1 and the member 4 are provided with attachments 5 for the mounting of the unit, for example in a conventional disc brake caliper of a rail vehicle. (Such a brake arrangement is not shown in the drawing but is well known to any person skilled in the art.) In this way a movement of the member 4 to the left in the drawing will result in a brake application.

A powerful coil spring or clock spring 6 is arranged in the housing 1. The outer end of the spring 6 is anchored to a rotatable motor sleeve 7 and its inner end to a rotatable drive sleeve 8, which is journalled in the housing 1.

An electric motor 10 is attached to the housing 1. It is drivingly connected to a gear ring 7' on the motor sleeve 7. A one-way coupling, for example a locking spring 12, enables the motor sleeve 7 only to be rotated in the direction for tightening the coil spring 6.

Coaxial with the drive sleeve 8 is a rotatable drive ring 13 in splines engagement with a spindle ring 14, which is attached to a rotatable spindle 15.

A rotary force transmission between the drive sleeve 8 and the drive ring 13 (and thus the spindle 15 via the spindle ring 14) is performed by means of an arrangement consisting of three concentric members, namely an outer locking spring 16, a control sleeve 17, and an inner locking spring 18.

The outer end, or theend to the right in FIG. 1, of the control sleeve 17 is provided with a gear ring 17' in engagement with corresponding gears on the rotary motor shaft 19 of an electric control motor 20 attached to the mechanism lid 3. The shaft 19 of the motor 20, which preferably may be of DC or step motor type, is provided withh a disc 21 cooperating with a fixed yoke 22. The disc 21 has circumferential control means, for example holes, for counting by the yoke 22 and thereby control of the rotation of the control motor 20, as will appear more clearly below.

A force transmitting sleeve 23 is attached to the force transmitting member 4. A ball nut 25, which together with the ball screw spindle 15 forms a ball screw, is non-rotatably attached to the force transmitting sleeve 23. The spindle 15 is journalled in the force transmitting sleeve 23 by means of a radial ball bearing 26 and in a force sensing cup 27 by means of a ball bearing 28. This bearing can also transmit axial forces from the spindle 15 to the cup 27.

An elastic disc 30 (of rubber or similar material) is confined between the force sensing cup 27 and the mechanism lid 3. A pressure transducer 31 is arranged in the lid 3 in contact with the elastic disc 30. By the design with a smaller force receiving area of the transducer 31 than the area of the force sensing cup 27, only a fraction of the total force from the spindle 15 is transmitted to the transducer 31, which may be of any conventional design and transmits an electric signal depending on the pressure or force exerted thereon.

The interaction between the different parts, especially the two locking springs 16 and 18 and the control sleeve 18, is to now be described.

The outer locking spring 16, which can also be called an application spring for reasons apparent below, primarily serves to prevent the drive sleeve 8 from rotating relative to the housing 1 in one direction. It is as shown axially confined, and its left hand end is locked to the drive sleeve 8. The major part of the spring 16 is arranged with its outer surface in contact with coaxial cylindrical inner surfaces of the sleeve 8 and the housing 1. A few turns of the locking spring 16 has a smaller diameter and are with its inner surface in engagement with the outer surface of the cylindrical control sleeve 17.

The inner locking spring 18, which can also be called a release spring, primarily serves to transmit rotational movement in one direction between the drive sleeve 8 and the drive ring 13 but also establishes a means for transmitting rotational movement in the other direction between the control sleeve 17 and the drive ring 13, as appears from the description below. The inner surface of the locking spring 18 is in contact with coaxial cylindrical outer surfaces of the drive sleeve 8 and the drive ring 13. The right hand end of the spring 18 is locked to the drive ring 13, whereas its left hand end is provided with an upwardly projecting end 18' engaging an axial projection 17" at the left hand end of the control sleeve 17.

The function of the arrangement so far described is as follows: Assuming that the coil spring 6 is tensioned or wound up by the electric motor 10 and backwards rotation of the latter is prevented by the one-way coupling 12, the drive sleeve 8 is subjected to a large torque in one rotational direction. However, the sleeve 8 is normally locked against rotation in this direction by the application spring 16.

By turning the control sleeve 17 (by means of the control motor 20) it is, however, possible to "open" the outer locking spring or application spring 16, i.e. to turn it in the direction opposite the locking direction, by means of the spring turns in engagement with the control sleeve 17. Hereby the drive sleeve 8 will be free to turn under the action of the coil spring 6 until the application spring 16 again locks the sleeve 8 to the housing 1. The turning movement of the drive sleeve 8 corresponds in other words to that of the control sleeve 17. During this turning movement the inner locking spring 18—due to its locking direction—transmits the turning movement and the torque to the drive ring 13.

The torque transmitted to the drive ring 13 is transferred through the ball screw spindle 15 to an axial force in the ball nut 25, the force transmitting sleeve 23 and the force transmitting member 4. The application stroke or movement is to the left in the drawing.

It is to be noted that the drive sleeve 8 is only allowed to rotate (for transmitting its torque to the drive ring 13 via the inner locking spring 18) when and to the extent the control sleeve 17 is rotated by the control motor 20 in the unlocking direction for the application spring 16. It is also to be noted that the control sleeve 17 itself is not subjected to the torque of the drive sleeve 8 and that only the small torque needed to overcome the pretension of the locking spring 16 is required for the control sleeve 17.

The release stroke or movement of the force transmitting member 4 and sleeve 23 to the right in the drawing (subsequent to an application stroke as described above) can be divided into two steps: a first step during which the member 4 and sleeve 23 are subjected to a return force to the right from the brake disc (or other braked member) and the whole brake caliper or rigging (in which the brake unit is arranged) ending with the situation where the brake pads are just about to leave the brake disc bringing down the return force to zero, and a second step during which the brake pads are removed from the brake disc the desired distance, in the art referred to as the slack.

For accomplishing a movement in the release direction during the first step mentioned above the control sleeve 17 is rotated in the direction opposite to that during the application stroke as described above. This rotation is not prevented by the turns of the outer locking spring 16 in engagement with the control sleeve 17, as the latter now is rotated in the direction for loosening the grip of the locking spring 16 thereon.

By the engagement between the axial projection 17" of the control sleeve 17 and the upwardly projecting end 18' of the inner locking spring or release spring 18, the latter will not prevent the drive ring 13 from turning under the action of the force being transformed from an axial one in the nut 25 to a rotational one in the spindle 15, but only as far as the control sleeve 17 is rotated. During this rotation the drive sleeve 8—all the time being subjected to the torque from the coil spring 6—is prevented from rotating by the outer locking spring 16 in engagement with the housing 1.

Again, it shall be noted that the rotational movement of the drive ring 13 corresponds to that of the control sleeve 17 and that practically no torque for rotating the latter is required from the control motor 10, namely only the torque required to overcome the pretension of the inner locking spring 18.

During the second step of the release stroke no torque is transmitted to the drive ring 13 from the brake rigging via the spindle 15. In order to establish the desired slack between the brake disc and the brake pads in the brake rigging, it is therefore necessary to apply another rotational force on the drive ring 13 for retracting the brake pads from the brake disc. This rotational force, which is relatively minor, stems from the control motor 20. At the further rotation thereof in the release direction its rotational movement is transmitted to the drive ring 13 through the release spring 18. Still, the drive sleeve 8 is held against rotation by the outer locking spring 16.

There is an electric and electronic system associated with the mechanical arrangement so far described. This system, which is not shown in the drawing, has the general function to supply the electric motor 10 and the control motor 20 with electric energy and to control their functions in the following way:

As is understood by the description above, the only function of the electric motor 10 is to supply the accumulator in the form of the coil spring 6 with energy or in other words to keep the spring 6 under tension. The motor works intermittently.

The system is so designed that the motor 10 is started
(1) when the system has been without current for any reason, and
(2) after the control motor 20 has started.

On the other hand, the motor 10 is shut off when the motor current reaches a predetermined value, indicating a tensioned coil spring 6.

Generally speaking, the control motor 20 (and the control sleeve 17 associated therewith) acts as a servo for the spindle 15. It functions in the following way under different conditions:

As described above, an application stroke is accomplished by rotating the control sleeve 17 by the control motor 20 in a certain direction—the application direction.

When the pressure transducer 31 indicates that a desired brake force, or in other words a counter-force in the spindle 15 transmitted to the transducer 31 via the spindle ring 14, the ball bearing 28, the force sensing cup 27 and the elastic disc 30, is being reached the control motor 20 is shut off. This means that no further rotational movement is transmitted to the drive ring 13 from the drive sleeve 8 via the inner locking spring 18.

After say two turns of the control motor 20 in the application direction as determined by the disc 21 and the yoke 22 the electric motor 10 is started after previously having been shut off.

The release stroke on the other hand is accomplished by rotating the control motor 20 in the opposite direction—the release direction.

This rotation of the control motor 20 occurs until the transducer 31 indicates a very low counter-force in the spindle 15, say 2 kN. From this indication the control motor 20 is allowed to rotate a few extra turns as determined by the disc 21 and yoke 22 in order to establish the desired slack between the brake pads and the brake disc in the brake rigging.

Numerous modifications are possible of the embodiment shown in FIG. 1 and described above with reference thereto.

Generally speaking, the electric motor 10 may have a different position, if for example a shorter unit is required, and may even be replaced with some other means for supplying energy to the coil spring 6, for example an air motor or a fluid operated cylinder, having the function always to keep the coil spring 6 under sufficient tension. Also, the coil spring 6 may be replaced with another type of spring or any other means for storing energy.

The different mechanical components of the arrangement, for example the journalling of the rotating parts and the type of ball screw employed, may vary greatly as is well known to any person skilled in the art.

More specifically, however, the left hand end of the inner locking spring 18 may as an alternative to the arrangement shown and described have the same design as the right hand end of the outer locking spring 16.

Further, as an alternative to the arrangement for providing a signal depending on the axial force in the force transmitting member 4 or the spindle 15, i.e. the force sensing cup 27, the elastic disc 30 and the pressure transducer 31, other means may be employed, for example suitably arranged strain gauges. This signal may also be derived from other parts of the brake rigging.

Figure 2:
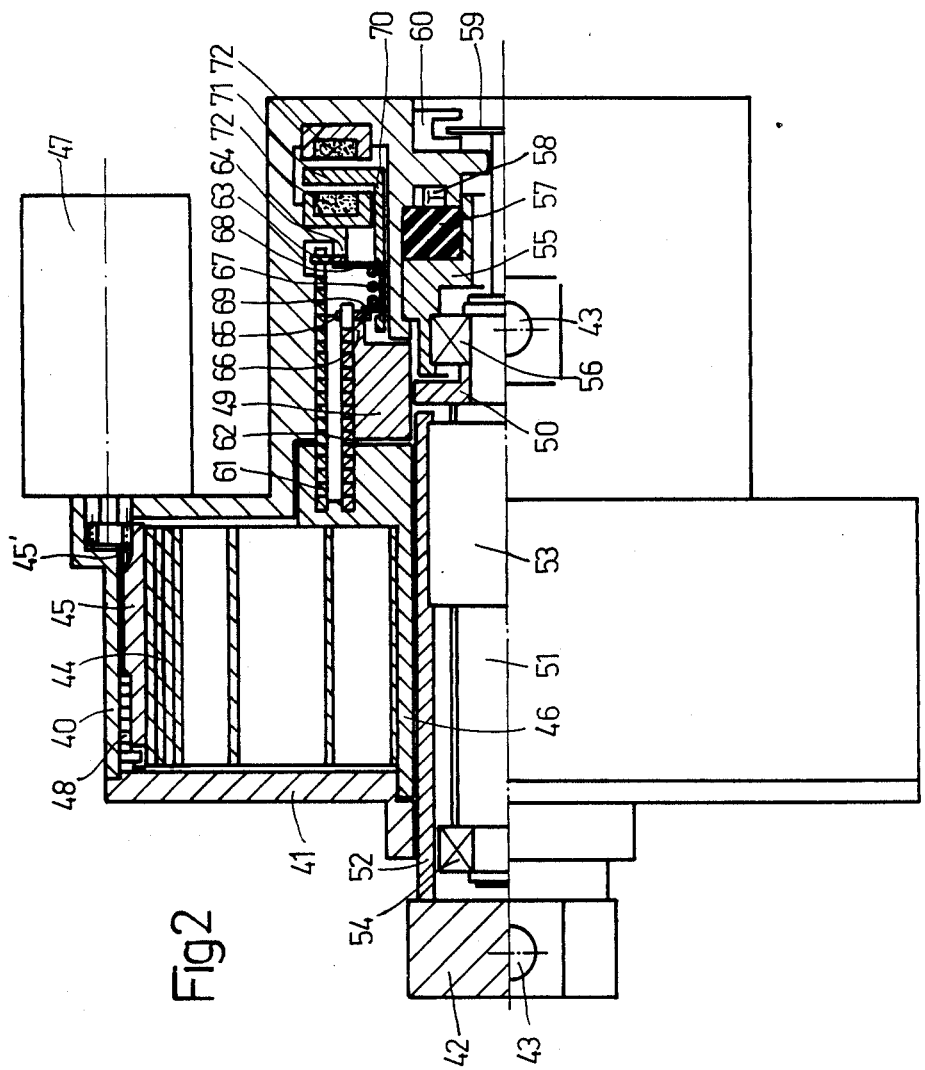

A second embodiment of the invention is shown in FIG. 2. This embodiment has many similarities with the first one shown in FIG. 1 and described above, whereas the main difference resides in the control system for the brake unit, which accordingly will be fully described.

The design and function of the following parts are virtually the same as in the first embodiment, and reference is accordingly made to the description above thereof: a housing 40, a spring lid 41, a force transmitting member 42, attachments 43, a coil spring or clock spring 44, a motor sleeve 45 with a gear ring 45', a drive sleeve 46, an electric motor 47, a locking spring 48, a drive ring 49, a spindle ring 50, a spindle 51, a force transmitting sleeve 52, a ball nut 53, a radial ball bearing 54, a force sensing cup 55, a ball bearing 56, an elastic ring 57, and a pressure transducer 58.

In this case the spindle 51 is prolonged and is provided with a disc 59 cooperating with a fixed yoke 60 (in the same way and for the same purpose as the disc 21 and yoke 22 in the FIG. 1 embodiment).

As in the FIG. 1 embodiment there is an outer locking spring 61 and an inner locking spring 62, generally speaking having the same functions as the corresponding locking springs 16 and 18 in the first embodiment. However, the control of these locking springs in quite different, as appears below.

The outer locking spring 61 is in its tensioned condition arranged with its outer surface in contact with coaxial cylindrical inner surfaces of the drive sleeve 46 and the housing 40. The inner locking spring 62 is in its tensioned condition with its inner surface in contact with coaxial cylindrical outer surfaces of the drive sleeve 46 and the drive ring 49.

A first clutch washer 63 is in non-rotatable but axially movable engagement with the right hand end of the outer locking spring 61. The washer 63 may engage a fixed shoulder 64 of the housing 40 to form a toothed clutch 63-64 therewith.

Likewise, a second clutch washer 65 is in non-rotatable but axially movable engagement with the right hand end of the inner locking spring 62. The washer 65 may engage a shoulder 66 of the drive ring 49 to form a toothed clutch 65-66 therewith.

The two clutch washers 63 and 65 are resiliently pressed apart for engagement with their respective shoulders 64 and 66 by a helical compression spring 67 arranged between two thrust collars: a first one 68 and a second one 69.

A cylindrical control member 70 is axially movable and provided with a radial part 71 arranged in the opposing fields of two electromagnets 72 fixed in the housing 40. At the two thrust collars 68 and 69 the control member 70 is provided with a cylindrical recess with a somewhat larger width than the distance between the two collars 68, 69. The respective end of this recess is arranged to cooperate with the respective collar in a way to be described below. In the shown neutral position (where neither of the two electromagnets 72 is energized), however, both clutches 63-64 and 65-66 are held engaged by the spring 67 (via the collars 68, 69).

As already stated, the general function of the embodiment according to FIG. 2 is the same as that according to FIG. 1.

Assume that the coil spring 44 is tensioned and that a brake application is desired. In order to accomplish this the locking effect of the outer locking spring or application spring 61 on the drive sleeve 46 must be overcome. By energizing the left electromagnet 72 the control member 70 is moved to the left in FIG. 2 allowing the clutch 63-64 to be disengaged and the locking spring 61 to become untensioned, so that it leaves its engagement with the housing 40. The torque is transmitted from the drive sleeve 46 via the inner locking spring 62 to the drive ring 49 and to the further parts, as described in more detail above in conjunction with FIG. 1.

The application continues as long as the left electromagnet 72 is energized, which is controlled in the corresponding way as the rotation by the motor 20 of the control sleeve 17 in the FIG. 1 embodiment. When this electromagnet is de-energized, the clutch 63-64 is engaged and the locking spring 61 again expanded into engagement with the inner cylindrical surface of the housing 40 preventing any further rotation of the drive sleeve 46.

A release stroke is accomplished in that the other or right electromagnet 72 is energized, so that the control member 70 is moved to the right in FIG. 2 and the clutch 65-66 is disengaged. In this way the inner locking spring 62 becomes untensioned and leaves its locking engagement with the drive ring 49, which accordingly will be free to rotate in the release direction in the same way as described above with reference to FIG. 1.

Figure 3:
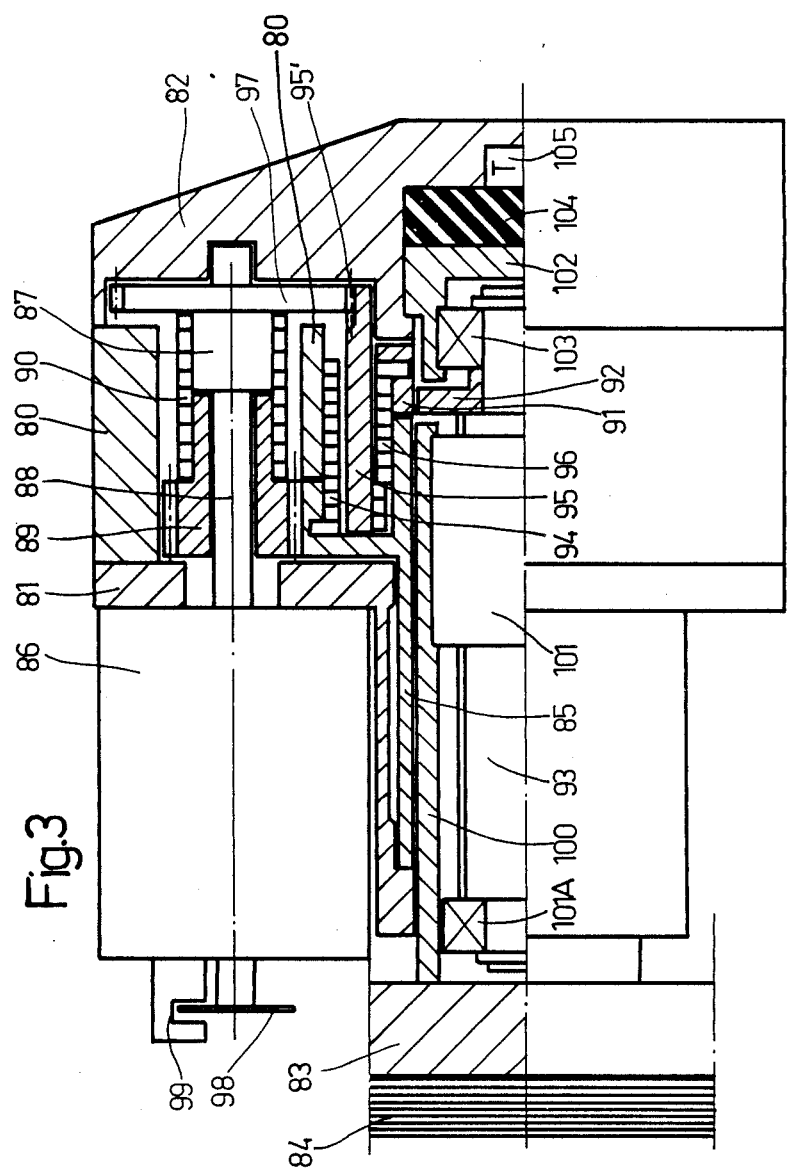

A third embodiment of the invention is shown in FIG. 3. This electromechanical brake unit has similarities with the first and second embodiments but differs therefrom mainly in that it is not provided with any coil spring for energy storage.

This unit has a housing 80 with a left lid 81 and a mechanism lid 82 to the right in the drawing. The lids 81 and 82 are screwed to the housing 80. The unit is also provided with a force transmitting member 83, which as appears below is axially movable in relation to the housing 80. A brake pad 84 is attached to the force transmitting member 83. The brake unit is to be arranged in the vicinity of a brake disc of a rail vehicle in a way that is well known to any person skilled in the art. Accordingly, a movement of the member 83 to the left in the drawing will result in a brake application.

A drive sleeve 85 is rotatably journalled in the housing. An electric motor 86 is attached to the left lid 81. It is drivingly connected to the drive sleeve 85 via an enlarged part 87 of a motor shaft 88, a pinion 89 in engagement with the drive sleeve 85, and a one-way clutch in the form of a locking spring 90 between the enlarged part 87 and the pinion 89. In this way the drive sleeve 85 may be rotated by the motor 87 only in the rotational direction for brake application, as will appear below; rotation of the motor 86 in the opposite direction is not transmitted to the drive sleeve 85 due to the one-way clutch 90.

Coaxial with the drive sleeve 85 is a rotatable drive ring 91 in splines engagement with a spindle ring 92, which is attached to a rotatable spindle 93.

A rotary force transmission between the drive sleeve 85 and the drive ring 91 (and thus the spindle 93 via the spindle ring 92) is performed by means of an arrangement consisting of three concentric members, namely an outer locking spring 94, a control sleeve 95, and an inner locking spring 96.

The outer end, or the end to the right in FIG. 3, of the control sleeve 95 is provided with a gear ring 95' in engagement with a gear wheel 97, which is arranged on the motor shaft 88 integral with its enlarged part 87.

The shaft 88, extending out to the left of the motor 86, is provided with a disc 98 cooperating with a fixed yoke 99 for accomplishing a position transducer. This position transducer is used to control the motor 86 for slack adjusting, as will appear below. By means of the gear wheel 97 the control sleeve 95 can be rotated by the electric motor 86 in both rotational directions.

A force transmitting sleeve 100 is attached to the force transmitting member 83. A ball nut 101, which together with the ball screw spindle 93 forms a ball screw, is non-rotatably attached to the force transmitting sleeve 100. The spindle 93 is journalled in the force transmitting sleeve 100 by means of a radial ball bearing 101A and in a force sensing cup 102 by means of a ball bearing 103, which is also transmitting axial forces from the spindle 93 to the cup 102.

An elastic disc 104 (of rubber or similar material) is confined between the force sensing cup 102 and the mechanism lid 82. A pressure transducer 105 is arranged in the lid 82 in contact with the elastic disc 104. By the design with a smaller force receiving area of the transducer 105 than the area of the force sensing cup 102, only a fraction of the total force from the spindle 93 is transmitted to the transducer 105, which may be of any conventional design and transmits an electric signal depending on the pressure or force exerted thereon.

The interaction between the different parts, especially the two locking springs 94 and 96 and the control sleeve 95, is now to be described.

The outer locking spring 94 serves to prevent the drive sleeve 85 from rotating relative to the housing 80 in one direction. Its left hand end is locked to the drive sleeve 85. The spring 94 is arranged with its outer surface in contact with coaxial cylindrical inner surfaces of the sleeve 85 and the housing 80.

The inner locking spring 96 primarily serves to transmit rotational movement in one direction between the drive sleeve 85 and the drive ring 91 but also establishes a means for transmitting rotational movement in the other direction between the control sleeve 95 and the drive ring 91, as will appear from the description below. The major part of the spring 96 is arranged with its inner surface in contact with coaxial cylindrical outer surfaces of the drive sleeve 85 and the drive ring 91. The right hand end of the spring 96 is locked to the drive ring 91, whereas a few turns of the spring 96 to the left have a larger diameter and with its outer surface are in engagement with the inner surface of the cylindrical control sleeve 95.

The function of the arrangement so far described is as follows: Let us assume that the different parts are in the respective positions shown in FIG. 3 and that the electric motor 86 is idle. In order to accomplish a brake application the motor 86 is started in its rotational direction for driving—via the locking spring 90 and the pinion 89—the drive sleeve 85 in the direction allowed by the outer locking spring 94. During this turning movement the inner locking spring 96—due to its locking direction—transmits the turning movement to the drive ring 91.

The electric motor 86 is not only rotating the drive sleeve 85 but also—via the gear wheel 97—the control sleeve 95 with at least the same rotational speed as the drive sleeve 85, so that also the turns of the inner locking spring 96 are conveyed in the rotational movement.

The rotation and torque from the electric motor 86 transmitted to the drive ring 91 is transferred through the ball screw spindle 93 to an axial force in the ball nut 101, the force transmitting sleeve 100 and the force transmitting member 83. The application stroke or movement is to the left in the drawing.

When the motor 86 is switched off, the whole arrangement is locked in the position attained, and not until the motor 86 is rotated in the opposite direction a release stroke as described below will be attained. This locking is accomplished by the two locking springs 94 and 96.

The release stroke or movement of the force transmitting member 83 and sleeve 100 to the right in FIG. 3 (subsequent to an application stroke as described above) can be divided into two steps: a first step during which the member 83 and sleeve 100 are subjected to a return force to the right from the brake disc (or other braked member) ending with the situation where the brake pad 84 is just about to leave the brake disc bringing down the return force to zero, and a second step during which the brake pad is removed from the brake disc the desired distance, in the art referred to as the slack.

For accomplishing a movement in the release direction during the first step mentioned above the control sleeve 95 is rotated in the direction opposite to that during the application stroke as described above. This rotation is accomplished by the electric motor 86 via the gear wheel 97. However, due to the locking spring 90 the rotation is not transmitted to the drive sleeve 85.

By the engagement with the control sleeve 95 of the turns of the inner locking spring 96 to the left in FIG. 3 the above mentioned backwards rotation of the control sleeve 95 opens up the locking spring 96 allowing the drive ring 91 to turn under the action of the force being transformed from an axial one in the nut 101 to a rotational one in the spindle 93, but only as far as the control sleeve 95 is rotated.

During the second step of the release stroke no torque is transmitted to the drive ring 91 fro the brake pad 84 via the spindle 93. In order to establish the desired slack between the brake disc and the brake pad, it is therefore necessary to apply another rotational force on the drive ring 91 for retracting the brake pad 84 from the brake disc. This rotational force, which is relatively minor, stems from the electric motor 86 via the gear wheel 97 and the control sleeve 95. At continued rotation of the sleeve 95 in the backwards direction or release direction this rotational movement is transmitted to the drive ring 91 through the inner locking spring 96. Still, the drive sleeve 85 does not take part in the rotational movement.

There is an electric and electronic system associated with the mechanical arrangement so far described. This system, which is not shown in the drawing, has the function to supply the electric motor 86 with electric energy for rotation in the appropriate direction.

As described above, an application stroke is accomplished by rotating the electric motor 86 and accordingly the control sleeve 95 in a certain direction—the application direction.

When the pressure transducer 105 indicates that a desired brake force, or in other words a counter-force in the spindle 93 transmitted to the transducer 105 via the spindle ring 92, the ball bearing 103, the force sensing cup 102 and the elastic disc 104, is being reached, the electric motor 86 is shut off.

The release stroke on the other hand is accomplished by rotating the electric motor 86 in the opposite—the release direction.

This rotation of the electric motor 86 continues until the transducer 105 indicates a very low counter-force in the spindle 93. From this indication the electric motor 86 is allowed to rotate some extra turns as determined by the position transducer 98, 99 in order to establish the desired slack between the brake pad and the brake disc.

Other ways of controlling the formation of the desired slack than by means of the position transducer are possible. For example, the electric motor 86 may be time-controlled.

A possible modification of the actuator shown in FIG. 3 is to replace the control of the inner locking spring 96 by means of the electric motor 86 via the members 87, 97 and 95 with the type of control shown in FIG. 2, i.e. with an electro-magnet.

In this way the control speed may be increased. Also, as a result of such a modification the transmission of brake forces from the actuator automatically ceases at the discontinuation of voltage supply—an effect which can be desired in certain cases. The reversed situation—namely that the actuator is automatically activated at the discontinuation of voltage supply—may alternatively be obtained.

I claim:

1. An actuator, comprising in combination a housing, a drive sleeve to be subjected to rotational movement and a drive ring for supplying a rotational movement, clutch means coupled between the drive sleeve and the housing for permitting rotation of the drive sleeve in a first direction, a locking spring for connection between the drive sleeve and the drive ring and coaxial therewith, and means for controlling the locking spring to drivingly connect the drive sleeve with the drive ring only at the rotation of the drive sleeve in the first direction but to allow rotation of the drive ring in a second opposite direction.

2. An actuator according to claim 1, characterized in that the means for controlling the locking spring is a control sleeve concentric with the drive sleeve and the drive ring and connected with one end of the locking spring so that rotation of the control sleeve in the second direction will open the locking spring and allow the drive ring to rotate the same angular distance as the control sleeve in the second direction.

3. An actuator according to claim 2, further comprising means for subjecting the drive sleeve to torque of a coil spring tensioned by an electric motor, characterized in that the clutch means comprises a further locking spring normally preventing rotation of the drive sleeve in the first direction and means connecting one end of the further locking spring to the control sleeve so that rotation thereof in the first direction will open the further locking spring and allow the drive sleeve to rotate the same angular distance as the control sleeve in the first direction.

4. An actuator according to claim 3, further characterized in that the control sleeve is connected to a control motor for rotation of the control sleeve in either direction.

5. An actuator according to claim 4, further comprising means connected to the drive ring for transforming the rotational movement thereof into an axial movement, characterized by pressure transducer means operable when a predetermined axial force has been obtained to transmit a signal for switching off the control motor rotation in the first direction.

6. An actuator according to claim 5, further characterized by means controlling the control motor at its rotation in second direction to rotate a certain angular distance for establishing a desired slack, after the pressure transducer has transmitted a signal indicating that the axial force is virtually zero.

7. An actuator according claim 1 further comprising connection means in which the drive sleeve is connected to a rotary electric motor, characterized in that the clutch means comprises a further locking spring for permitting rotation of the drive sleeve by the motor only in the first direction.

8. An actuator according to claim 7, further characterized by means drivingly connecting the motor to a control sleeve for permitting rotation thereof in both directions, and connection means structure between the motor and the drive sleeve including a one-way clutch only transmitting rotation to the drive sleeve in the first direction.

9. An actuator according to claim 1, further comprising means subjecting the drive sleeve to the torque of a coil spring tensioned by an electric motor, characterized in that the clutch means comprises an outer locking spring normally preventing rotation of the drive sleeve in the first direction and in that the means for controlling the locking spring is arranged between the drive sleeve and the drive ring to control an inner locking spring member and an outer locking spring member comprises, a control member axially movable under the influence of two electromagnets for unlocking an end of either locking spring member from the housing or the drive ring respectively for allowing rotation of the drive sleeve in the first direction or the drive ring in the second direction.

* * * * *